United States Patent Office 3,701,791
Patented Oct. 31, 1972

3,701,791
SALICYLOYLAMINO-ANTHRAQUINONE PIGMENTS
André Pugin, Riehen, Kurt Burdeska, and Ernst Model, Basel, Switzerland, assignors to Ciba-Geigy AG, Basel, Switzerland
No Drawing. Filed Sept. 15, 1969, Ser. No. 858,126
Claims priority, application Switzerland, Oct. 11, 1968, 15,204/68
Int. Cl. C09b 1/42, 1/54
U.S. Cl. 260—377       7 Claims

ABSTRACT OF THE DISCLOSURE

Anthraquinones are described which contain at least two salicyloylamino substituents in which substituents the benzene nucleus is substituted by $R_1$ being hydrogen, chlorine, bromine, the methyl, hydroxyl, methoxy, cyano or phenyl group or an alkylsulphonyl group having 1–4 carbon atoms, and
$R_2$ being hydrogen, chlorine, bromine or the methyl group;

these anthraquinones are yellow to orange coloured pigments of very good weather- and light-fastness and good fastness to migration and over-lacquering in synthetic plastic materials, as well as good colour strength.

DESCRIPTION OF THE INVENTION

The present invention concerns new anthraquinone pigments, a process for the production thereof and the application of the new compounds for the pigmenting of high molecular organic material.

It is known that 1 - salicylic acid amido-anthraquinones are suitable as pigments. Pigments of this series are thus known wherein the salicylic acid radical is substituted by chlorine. These pigments usually have a very good fastness to light but the other fastness properties, especially fastness to migration and cross-lacquering, are not good, so that their use in lacquers and plastics is extremely limited.

It was therefore not foreseeable that the pigments, according to the invention, not only exhibit fastness to light but also, to a high degree, to migration, cross-lacquering, solvents and particularly to weather, even in lacquers containing aluminium powder. The compounds concerned are of the formula

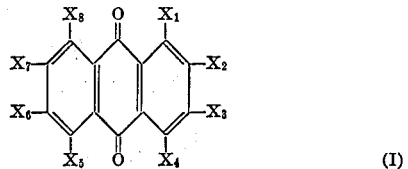

(I)

wherein
at least 2 of the symbols $X_1$, $X_4$, $X_5$ and $X_8$ represent an acylamino group, of which at least 2 represent a salicylic acid amide group of the Formula II

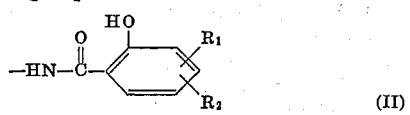

(II)

wherein
$R_1$ denotes hydrogen, chlorine, bromine, the methyl, hydroxyl, methoxy, cyano or phenyl group or an alkylsulphonyl group having 1–4 carbon atoms and
$R_2$ denotes hydrogen, chlorine, bromine or the methyl group, and wherein of the symbols $X_1$–$X_8$ at most 4 represent chlorine or bromine, at most 2 represent the methyl, cyano, methoxy or ethoxy group and the remainder hydrogen.

These pigments are produced according to the invention by condensing diaminoanthraquinones of the Formula III

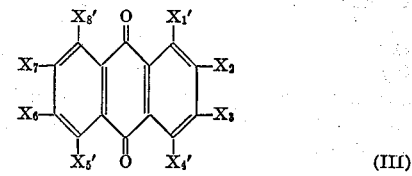

(III)

wherein at least 2 of the symbols X' in α-position represent an $NH_2$-group, of the remaining symbols $X_1'$, $X_2$, $X_3$, $X_4'$, $X_5'$, $X_6$, $X_7$ and $X_8'$ at most 4 represent chlorine or bromine, at most 2 the methyl, cyano, methoxy or ethoxy group, of the symbols X' in α-position at most 2 represent an acylamino group and the remaining symbols X and X' denote hydrogen, with a compound introducing the salicyl group of the Formula IV

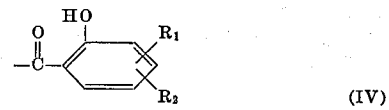

(IV)

wherein the radicals $R_1$ and $R_2$ have the meaning given in claim 1.

Suitable compounds yielding the salicylic acid radical of the Formula III are the corresponding salicylic acids or salicylic acid halides. The condensation is advantageously performed in an inert, high-boiling organic solvent such as chlorobenzene, nitrobenzene, o-dichlorobenzene or trichlorobenzene, in the presence or absence of condensation agents, optionally by heating with acid-binding agents such as pyridine, quinoline or sodium acetate. In individual cases, depending on the condensation conditions, one and the same product may have different crystalline modifications.

Suitable starting products for the production of pigments according to the invention are, e.g. the following aminoanthraquinones:

1,4-diaminoanthraquinone
1,5-diaminoanthraquinone
1,4,5,8-tetraaminoanthraquinone
2,3-dichloro-1,4-diaminoanthraquinone
4,8-dichloro-1,5-diaminoanthraquinone
2,3-dibromo-1,4-diaminoanthraquinone
2,6-dibromo-1,5-diaminoanthraquinone
2-bromo-1,4-diaminoanthraquinone
2,4,6,8-tetrabromo-1,5-diaminoanthraquinone
2,4,5,7-tetrachloro-1,8-diaminoanthraquinone
2-methyl-1,4-diaminoanthraquinone
2-methyl-1,5-diaminoanthraquinone
2-methyl-1,8-diaminoanthraquinone
2,6-dimethyl-1,5-diaminoanthraquinone
2,7-dimethyl-1,8-diaminoanthraquinone
2-methoxy-1,4-diaminoanthraquinone
1,5-dimethoxy-4,8-diaminoanthraquinone
1,8-dimethoxy-4,5-diaminoanthraquinone
2-ethoxy-1,4-diaminoanthraquinone
2,3-dicyano-1,4-diaminoanthraquinone The no further substituted 1,4- or 1,5-diaminoanthraquinone, as well as the 1,4,5,8-tetraaminoanthraquinone, is preferred.

The salicylic acid amide groups in the pigments, according to the invention, preferably have chlorine, bromine, methyl or methoxy substituents.

The pigments according to the invention have in general a good texture and can be frequently used in the form of their crude product. Where necessary or desired, the crude products can be converted into a finely dispersed form by grinding or kneading. Grinding auxiliary agents are thereby advantageously used, such as inorganic and/or organic salts, in the presence or absence of organic solvents. An improvement in the properties can often be achieved moreover by heating the crude pigments in hot organic solvents. After grinding, the auxiliary agents are removed in the usual manner; soluble inorganic salts are removed for example with water and organic auxiliaries volatile in steam by, e.g. steam distillation. A reprecipitation from sulphuric acid also frequently suffices to obtain a deeply coloured, finely dispersed pigment. By treating a crystallised crude pigment with organic solvents, by dissolving and reprecipitating with sulfuric acid, as well as by grinding with salt, other crystalline modifications are obtained.

The pigments according to the invention are suitable for the pigmenting of high molecular organic material and they possess the already mentioned good fastness properties. They are used in poster and sheet-metal printing, in printing inks, for the printing industry, in paints having an oily base such as in linseed-oil paints, or with an aqueous base such as dispersion paints, or in lacquers of varying kinds such as in nitrolacquers or stoving lacquers, in the latter case those, for example, having an alkyd resin base. They can also be used for the spinning-dyeing of viscose or cellulose acetate, for the pigmenting of plastics as well as fibers, such as polyethylene, polypropylene, polyurethane, polystyrene, polyesters, polyacrylonitrile, polyamide and polyvinyl chloride, whereby the latter can also contain softeners, also for the pigmenting of cellulose esters, curable resins or for the pigmenting of rubber. The pigments can also be used for dyeing of paper pulp or for the coating of webs, e.g. in the processing of laminated paper.

Pigments of particularly good colour strength, weatherfastness, light-fastness, fastness to migration in synthetic plastic materials and to overlacquering are those falling under Formula I in which said acylamino is selected from alkanoylamino of from 1 to 3 carbon atoms and a benzoylamino radical any substituent of which is selected from fluorine, chlorine, bromine, methyl, methoxy, nitro and phenyl, and more particularly those wherein $X_1$ and $X_5$ represent a group of the formula

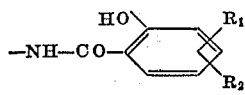

wherein $R_1$ represents chlorine, bromine, methyl, methoxy or phenyl, and
$R_2$ represents hydrogen, methyl, chlorine or bromine, and $X_2$, $X_3$, $X_4$, $X_6$, $X_7$, and $X_8$ represent hydrogen.

The following examples illustrate the invention without limiting it in any way. All temperatures are given in degrees centigrade.

Example 1

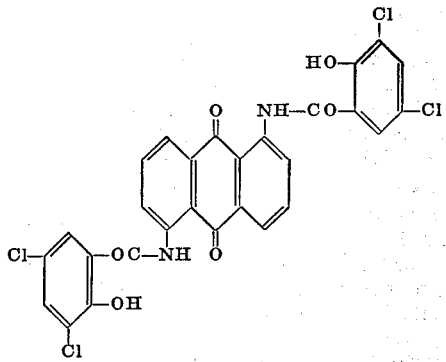

39.74 g. of 2-hydroxy-3,5-dichloro-1-benzoic acid are suspended in 400 ml. of anhydrous nitrobenzene and, after the addition of 0.5 ml. of dimethylformamide, 24 g. of thionyl chloride are added to the suspension. The latter is then heated in 30 minutes to 100° and stirred for a further hour at this temperature. A dry stream of nitrogen is now fed into the obtained solution during 15 minutes. A suspension of 19.45 g. of 1,5-diaminoanthraquinone in 100 ml. of anhydrous nitrobenzene is subsequently poured in, the mixture stirred for a further 30 minutes at 100–105° and then heated for 3 hours to 160–165°. After cooling to 110°, the yellow product of the above given formula is filtered off, washed with nitrobenzene at 110°, then washed with alcohol and dried at 100° in vacuo. By this means are obtained 46 g. of a yellow product which, after salt milling, yields a deeply-coloured yellow pigment having very good fastness to light, weather, cross-lacquering and migration.

Example 2

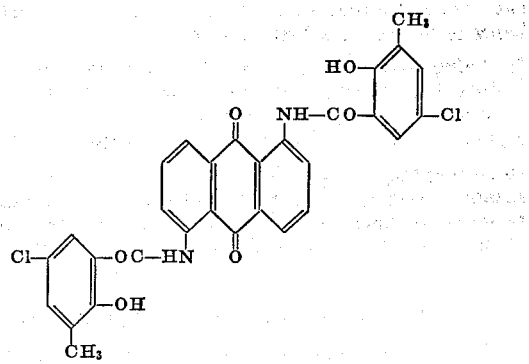

A solution of 11.86 g. of thionyl chloride in 25 ml. of nitrobenzene is added dropwise in 1 hour, while stirring well, to a suspension (heated to 105–110°) of 9.52 g. of 1.5-diaminoanthraquinone and 19.1 g. of 2-hydroxy-3-methyl-5-chloro-1-benzoic acid in 250 ml. of nitrobenzene. The yellow suspension is further stirred for 30 minutes at 105–110° and then heated for 2½ hours to 145–150°. After cooling to 100°, the yellow crystalline product is filtered off, washed with nitrobenzene and alcohol and dried in vacuo at 90–100°.

In this manner are obtained 20.2 g. of a deeply-coloured yellow pigment of the above given formula having very good fastness to light, cross-lacquering and migration.

Example 3

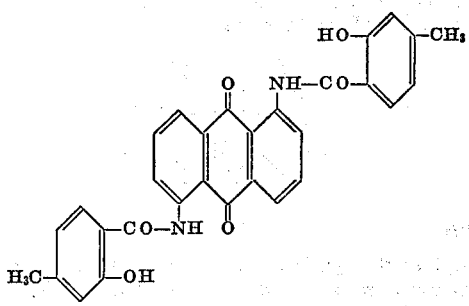

9.52 g. of 1.5-diaminoanthraquinone, 14.6 g. of 2-hydroxy-4-methyl-1-benzoic acid and 220 ml. of 1,2,4-trichlorobenzene are heated while stirring to 105–110°. Into the obtained suspension are then added dropwise in 1 hour, 11.86 g. of thionyl chloride, dissolved in 25 ml. of 1,2,4-trichlorobenzene. Stirring proceeds at 105–110° until the evolution of hydrochloric acid is completed (ca. 45 minutes), whereupon the mixture is heated for a further 3 hours to 145–150°. After cooling to 110°, the pigment of the above formula, precipitated in the form of long orange-red needles, is filtered off, washed with 1,2,4-trichlorobenzene and alcohol and dried in vacuo at 90–100°.

18 g. of a reddish-yellow pigment are thus obtained having a very good fastness to cross-lacquering, migration and light.

If the 14.6 g. of 2-hydroxy-4-methyl-1-benzoic acid are replaced by equimolecular amounts of a 2-hydroxy-1-benzoic acid listed in the following table, using otherwise the same procedure, pigments are thus obtained having similarly good fastness properties.

TABLE 1

| No. | 2-hydroxy-1-benzoic acid | Shade in paper printing |
|---|---|---|
| 4 | HO—⌬—CH₃ / HOOC— | Reddish-yellow. |
| 5 | HO—⌬ / HOOC——CH₃ | Yellow. |
| 6 | HO—⌬—CH₃ / HOOC——CH₃ | Reddish-yellow. |
| 7 | HO—⌬—CH₃ / HOOC——Cl | Do. |
| 8 | HO—⌬—Cl / HOOC— | Do. |
| 9 | HO—⌬—Cl / HOOC— | Do. |
| 10 | HO—⌬ / HOOC——Cl | Do. |
| 11 | HO—⌬—Cl / HOOC——Cl | Do. |
| 12 | Cl / HO—⌬ / HOOC— / Cl | Do. |
| 13 | HO—⌬—OCH₃ / HOOC— | Do. |
| 14 | HO—⌬ / HOOC——OCH₃ | Do. |
| 15 | HO—⌬—OCH₃ / HOOC——Cl | Do. |
| 16 | HO—⌬—OCH₃ / HOOC——Br | Yellowish-orange. |
| 17 | HO—⌬—CH₃ / HOOC——Cl | Yellow. |
| 18 | HO—⌬ / HOOC——Br | Do. |
| 19 | HO—⌬—Br / HOOC——Br | Do. |
| 20 | HO—⌬ / HOOC——OH | Reddish-yellow. |
| 21 | HO—⌬—CN / HOOC— | Do. |
| 22 | HO—⌬—SO₂CH₃ / HOOC— | Yellow. |
| 23 | HO—⌬—C₆H₅ / HOOC— | Do. |

Example 24

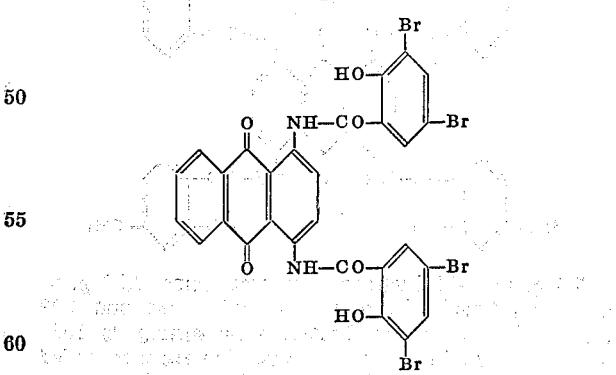

7.14 g. of 1,4-diaminoanthraquinone are heated to 105–110° with 21.3 g. of 2-hydroxy-3,5-dibromo-1-benzoic acid and 200 ml. of distilled nitrobenzene. To the obtained suspension are then added in 1 hour, while stirring well, 8.92 g. of thionyl chloride dissolved in 25 ml. of nitrobenzene. After stirring for 30 minutes at 105–110°, the orange-coloured suspension is heated for a further 2½ hours to 155–160°. The suspension is then cooled to 100° and the precipitated orange-red product is filtered off. It is washed with nitrobenzene, then with alcohol and dried in vacuo at 90–100°.

Using this procedure, 19 g. of a reddish-yellow pigment of the above given formula are obtained, which has a very good fastness to light, cross-lacquering and migration. After grinding this pigment with calcium chloride in a ball mill in the presence of a small amount of petroleum ether fraction boiling between 150 and 250°, a pigment which is also fast, but purer and more intensive in color is obtained, having an X-ray spectrum different from that of the crude product.

If the 7.14 g. of 1,4-diaminoanthraquinone are replaced by the equimolecular amount of 1,4-diamino-2,3-dichloroanthraquinone, using otherwise the same procedure, then likewise is obtained a reddish-yellow pigment having similar properties.

Example 25

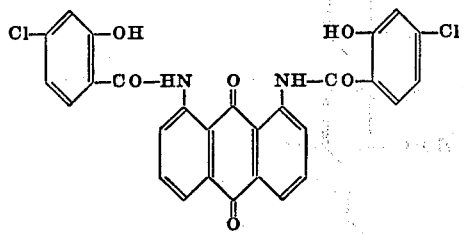

9.52 g. of 1,8-diaminoanthraquinone are heated with 16.6 g. of 2-hydroxy-4-chlorobenzene-1-carboxylic acid and 200 ml. of nitrobenzene to 90–95°. To the orange-red suspension is then added within 1½ hours, while stirring well, a solution of 11.86 g. of thionyl chloride in 25 ml. of nitrobenzene. The temperature is raised in 1 hour to 145–150° and stirring is continued for a further 3½ hours at this temperature. After cooling to 90°, the orange-red product is filtered off, washed with nitrobenzene and alcohol and dried. The yield is 18 g.

10 g. of the finely pulverised pigment of the above given formula are dissolved at 5–10° in 200 g. of 96% sulphuric acid and then stirred for a further 15 minutes at this temperature. The solution is then poured into 1.5 kg. of ice water in 30 minutes. The product is filtered off, washed free of acid with water and dried at 50–60° in vacuo. In this manner is obtained a deeply-coloured, transparent reddish-yellow pigment having a very good fastness to light, cross-lacquering and migration.

Example 26

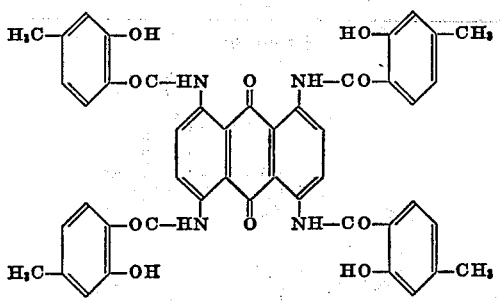

5.4 g. of 1,4,5,8-tetraaminoanthraquinone, 15.8 g. of 2-hydroxy-4-methyl-benzene-1-carboxylic acid and 200 ml. of nitrobenzene are heated, while stirring, to 105–110°. Into the dark-coloured suspension are then added dropwise in 1 hour, 12.84 g. of thionyl chloride, dissolved in 25 ml. of nitrobenzene. The suspension is heated within 1 hour to 175–180° and stirring is continued for a further 3 hours at this temperature. To complete the reaction, the temperature is raised for a further 30 minutes to 200°. After cooling to 80°, the brown-violet, fine-crystalline product is filtered off, washed with nitrobenzene, alcohol and acetone and dried in vacuo at 90–100°. The yield amounts to 12.4 g. 10 g. of the brown-violet pigment of the above given formula are ground in a 1-litre vibratory-mill (containing 3.6 kg. of iron balls each of 1.5 cm. diameter) with 45 g. of anhydrous calcium chloride and 1.5 g. of a petroleum fraction, boiling between 150 and 230°, for 1½ hours. The ground material is then extracted with dilute hydrochloric acid, the residue filtered off, washed with water and dried in vacuo at 50–60°. By this means is obtained a greenish-blue pigment having a soft texture and exhibiting a very good fastness to light, cross-lacquering and migration.

Example 27

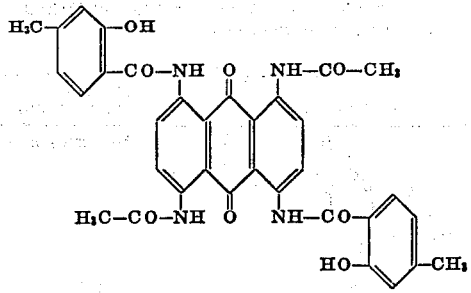

10.6 g. of 1,5-diacetylamino-4,8-diaminoanthraquinone, 11.9 g. of 4-methyl-2-hydroxybenzene-1-carboxylic acid and 200 ml. of nitrobenzene are heated to 105–110°. Into the blue suspension is then introduced in 1 hour a solution of 9.3 g. of thionyl chloride in 25 ml. of nitrobenzene. The temperature is then raised within 2½ hours to 195° and stirring continues for a further 2 hours at this temperature. After cooling to 100°, the precipitated violet product is filtered off, washed with nitrobenzene, alcohol and acetone and dried.

12.5 g. of a pigment of the above given formula are thus obtained which, after milling with salt or reprecipitation from sulphuric acid, yields blue dyeings having a very good fastness to light, cross-lacquering and migration.

If the 10.6 g. of 1,5-diacetylamino-4,8-diaminoanthraquinone are replaced by 14.3 g. of 1,5-dibenzoyl-amino-4,8-diaminoanthraquinone, or equivalent amounts of 1,5-di-(2',4'-dichlorobenzoyl-amino)-4,8-diaminoanthraquinone,
1,5-di-(4'-fluorobenzoyl-amino)-4,8-diaminoanthraquinone,
1,5-di-(2'-bromobenzoyl-amino)-4,8-diaminoanthraquinone,
1,5-di-(4'-methylbenzoyl-amino)-4,8-diaminoanthraquinone,
1,5-di-(4'-methoxy-3'-nitrobenzoyl-amino)-4,8-diaminoanthraquinone,
1,5-di-(4'-phenylbenzoyl-amino)-4,8-diaminoanthraquinone, using otherwise the same procedure, then likewise is obtained a blue pigment possessing similarly good fastness properties.

Example 28

2 parts of the pigment, produced according to Example 3, with 36 parts of hydrate of alumina, 60 parts of linseed-oil varnish of medium viscosity and 0.2 part of cobalt linoleate are mixed and triturated on the three-roller mill. An ink for printing purposes is obtained which yields reddish-yellow printings having a good degree of purity, high tinctorial strength and exhibiting a very good fastness to light.

Example 29

2 parts of the pigment, produced according to Example 2, together with 10 parts of titanium dioxide, 35 parts of a 60% solution of a modified urea alkyd resin in a mixture of xylene and butanol in the reciprocal proportion of 1:1, 10 parts of oil of turpentine and 5 parts of xylene are ground for 48 hours in a ball mill. If this coloured lacquer is poured on to aluminium sheet and fixed by stoving for one hour at 120°, then a pure yellow dyeing is obtained having a very good fastness to cross-lacquering, light and weather.

Example 30

67 parts of polyvinyl chloride, 33 parts of dioctyl phthalate, 2 parts of dibutyl tin dilaurate, 0.6 part of the pigment produced according to Example 19, and 2 parts of titanium dioxide are mixed together and rolled for 10–15 minutes at 140°. Reddish-yellow polyvinyl chloride films are obtained having very good fastness to migration and light.

We claim:
1. A pigment of the formula

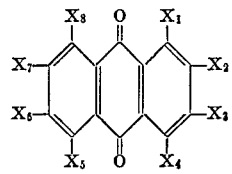

wherein at least two of $X_1$, $X_4$, $X_5$ and $X_8$ represent acylamino, and at least two of said acylamino represent a group of the formula

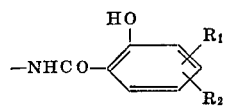

wherein $R_1$ represents chlorine, bromine, methyl, methoxy, or phenyl and $R_2$ represents hydrogen, chlorine, bromine or methyl, wherein said acylamino other than

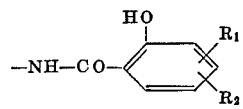

is selected from the group consisting of alkanoyl-amino of from 1 to 3 carbon atoms and a benzoylamino radical any substituent of which is fluorine, bromine, chlorine, methyl, methoxy, nitro or phenyl, and wherein from zero to four of $X_1$ thorugh $X_8$ represent chlorine or bromine, at most two represent methyl, cyano, methoxy or ethoxy, and the remainder represent hydrogen.

2. A pigment as defined in claim 1, wherein each of $X_1$ and $X_5$ represents a group of the formula

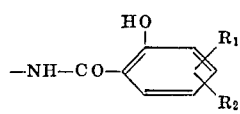

wherein
$R_1$ represents chlorine, bromine, methyl, methoxy or phenyl, and
$R_2$ represents hydrogen, methyl, chlorine or bromine, and
$X_2$, $X_3$, $X_4$, $X_6$, $X_7$, and $X_8$ represent hydrogen.

3. A pigment as defined in claim 2, which is of the formula

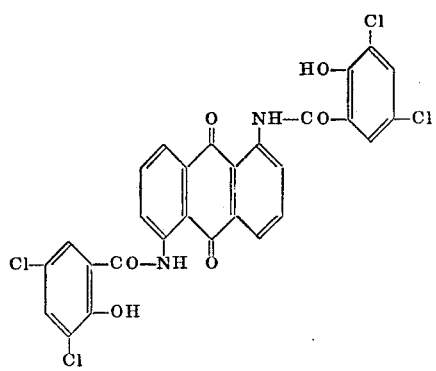

4. A pigment as defined in claim 2, which is of the formula

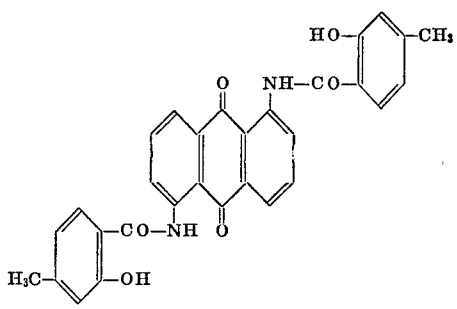

5. A pigment as defined in claim 2, which is of the formula

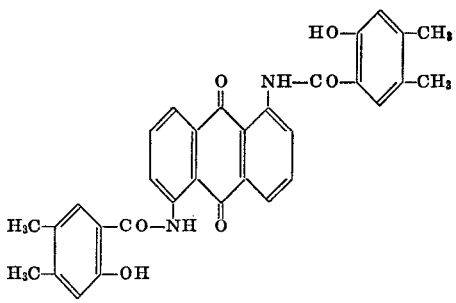

6. A pigment as defined in claim 2, which is of the formula

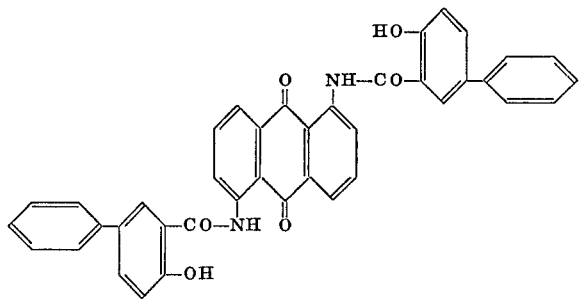

7. A pigment as defined in claim 2, which is of the formula

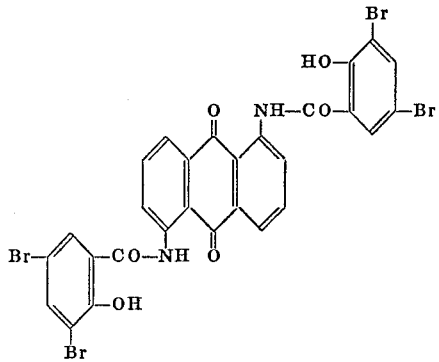

References Cited

UNITED STATES PATENTS

| 2,041,550 | 5/1936 | Krzikalla et al. | 260—377 |
| 2,833,789 | 5/1958 | Giambalvo | 260—377 |

FOREIGN PATENTS

| 2,702 | 1909 | Great Britain | 260—377 |

LORRAINE A. WEINBERGER, Primary Examiner
E. J. SKELLY, Assistant Examiner

U.S. Cl. X.R.

8—4, 5, 7, 39, 40; 106—22; 260—37 N, 37 NP, 40 R, 40 TN, 41 C, 372